Dec. 13, 1960  M. A. BERGSTEDT ET AL  2,964,422
PRESSURE SENSITIVE ADHESIVE SHEET AND METHOD OF MANUFACTURE
Filed Feb. 28, 1958
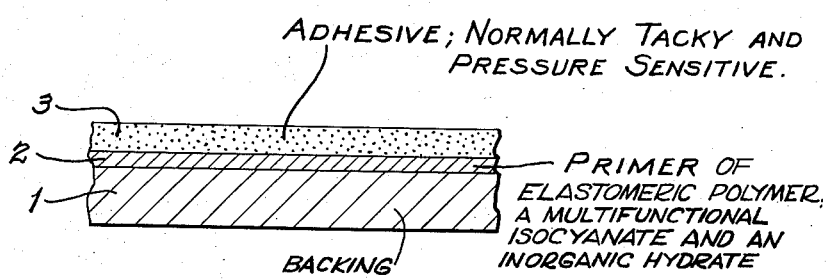
INVENTORS
MILTON A. BERGSTEDT
BY JOHN H. COLLINS
Morgan, Finnegan, Durham & Pine
ATTORNEYS.

United States Patent Office 2,964,422
Patented Dec. 13, 1960

2,964,422

PRESSURE SENSITIVE ADHESIVE SHEET AND METHOD OF MANUFACTURE

Milton A. Bergstedt, Linden, and John H. Collins, New Brunswick, N.J., assignors, by mesne assignments, to Johnson & Johnson, New Brunswick, N.J., a corporation of New Jersey Filed Feb. 28, 1958, Ser. No. 718,250

6 Claims. (Cl. 117—76)

This invention relates to improvements in pressure-sensitive adhesive tapes and sheets and in primer compositions for use in connection therewith.

The single drawing illustrates the product of this invention.

Pressure-sensitive adhesive tapes require secure bond of the tacky pressure-sensitive adhesive to the backings so as to prevent transfer of adhesive when the tacky surface is pressed into contact with itself, or with a part of the backing, and then pulled apart. Such bonding is accomplished usually by interposing a primer coat between the pressure-sensitive adhesive layer and the flexible backing.

Many of the primer compositions of the prior art require a long period of aging for adequate bonding thereof to the tape backing. Accordingly, in many instances, there is a delay of many days before the adhesive coat may be safely applied to the primed backing. Certain of the heretofore known primers show poor anchorage of primer and/or adhesive mass on tape aging.

Accordingly, it is an object of this invention to provide an improved primer composition adapted to bond conventional normally tacky and pressure-sensitive adhesive compositions to various films normally employed as backings of pressure-sensitive tapes. A further object of this invention is to provide improved primer compositions which bond to conventional tape backings within a relatively short period of time whereby normally tacky and pressure-sensitive adhesives may be applied to the primed backings without undue delay. A still further object of this invention is the provision of normally tacky and pressure-sensitive adhesive tapes having the characteristics set forth in the foregoing objects.

In accordance with the present invention, a primer is prepared by combining an elastomeric polymer described hereinafter in detail, a polyfunctional isocyanate or polyfunctional isothiocyanate and a water releasing agent. The polyfunctional isocyanate or isothiocyanate will hereinafter be referred to as "polyisocyanate."

In general, for every 100 parts of elastomeric polymer, the polyisocyanate is generally in an amount from about 5 to about 50 parts by weight, and preferably 14 to 21 parts by weight for every 100 parts by weight of total elastomeric polymer. In general, the water releasing agent is in an amount from 5 to 50 parts by weight per 100 parts of elastomeric polymer, and preferably 10–20 parts by weight.

The elastomeric polymer useful in accordance with this invention is selected from the group of natural rubber such, for example, as crude rubber and butadiene-styrene copolymers. When the elastomeric polymer is a butadiene-styrene copolymer, the butadiene monomer used in forming the copolymer is generally in an amount from about 40 to about 80% by weight of total monomers. If so desired, the elastomeric polymer may be a mixture of natural rubber and butadiene-styrene copolymer. In like manner, the elastomeric polymer may include a modifying rubber such, for example, as butadiene-acrylonitrile copolymer. In such instance, however, the crude rubber and/or butadiene-styrene copolymer should be in an amount of at least about 25% by weight of total elastomeric polymer. When a butadiene-acrylonitrile copolymer is employed, the butadiene monomer employed in forming the copolymer is generally in an amount from about 55% to about 85% by weight of total monomers reacted.

The water releasing agents employed in accordance with this invention are generally inorganic hydrates. These compounds release water so as to accelerate bonding of the primer composition to a tape backing. Examples of suitable hydrates for this purpose are borax ($Na_2B_4O_7.10H_2O$), sal soda ($Na_2CO_3.10H_2O$) and aluminum hydrate ($Al_2O_3.3H_2O$).

Examples of polyisocyanates, polyisothiocyanate and mixed isocyanate-isothiocyanate are as follows:

Hexamethylene diisocyanate, paraphenylene diisocyanate, 2,3-dimethyl-tetramethylene diisocyanate, decamethylene diisocyanate, hexamethylene diisothiocyanate, para, para-diphenylene diisocyanate, 2-chlorotrimethylene diisocyanate, 5-nitro-1,3-phenylene diisocyanate, ethylene diisocyanate, dodecamethylene diisocyanate, butane-1,2,2-triisocyanate, ethylene diisothiocyanate, meta-phenylene diisocyanate, para-phenylene diisothiocyanate, hexamethylene-1-isocyanate-4-isothiocyanate, benzene-1,2,4-triisothiocyanate, polymethylene diisocyanates and diisothiocyanates such as trimethylene diisocyanate, tetramethylene diisocyanate, pentamethylene diisocyanate, etc., the corresponding isothiocyanates; alkylene diisocyanates and diisothiocyanates such as propylene-1,2-diisocyanate, butylene-1,2-diisocyanate, butylene-1,3-diisocyanate, butylene-2,3-diisocyanate, and butylene-1,3-diisothiocyanate; alkylidene diisocyanates and diisothiocyanates such as ethylidene diisocyanate ($CH_3CH(NCO)_2$), butylidene diisocyanate ($CH_3$—$CH_2$—$CH(NCO)_2$) cyclo-alkylene diisocyanates and diisothiocyanates such as cyclo-hexylene-1,2-diisocyanates; aromatic diisocyanates and diisothiocyanates, 1-methyl-phenylene 2,4-diisocyanate, naphthylene-1,4-diisocyanate; aliphatic aromatic diisocyanates or diisothiocyanates such as xylylene diisocyanate, 4,4'-diphenyl methane diisocyanate, xylylene diisothiocyanate, and diisocyanates containing hetero atoms such as

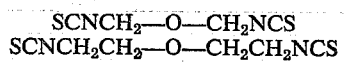

$SCNCH_2$—$O$—$CH_2NCS$
$SCNCH_2CH_2$—$O$—$CH_2CH_2NCS$
and $SCN(CH_2)_3$—$S$—$(CH_2)_3NCS$ The primer compositions of this invention have been found to be particularly useful in bonding normally tacky and pressure-sensitive adhesives to cellophane films and terephthalate polyester films manufactured by Du Pont and sold under the trade name "Mylar." It should be realized, however, that the primer compositions of this invention are useful in bonding normally tacky and pressure-sensitive adhesives to other conventional adhesive tape film backings such, for example, as cellulose acetate, metallized "Mylar," and polycarbonate films.

To illustrate the representative embodiments of the invention by way of example only but not to limit its scope in any way, illustrative examples are furnished below in Table I. In preparing the primer composition of this invention, the elastomeric polymer is prepared in the form of a solution employing a suitable solvent (e.g. toluene) in any conventional manner such, for example, in a rubber mill. The water releasing agent is added to the rubber in the rubber mill. Separately, a polyisocyanate solution is prepared by adding the polyisocyanate to a suitable solvent (e.g. monochlorbenzene). The elastomeric polymer solution containing the water releasing agent and the polyisocyanate solution are mixed just prior to use. This is to avoid any gelling action that might occur if the polyisocyanate and the water releasing agent were combined prematurely.

TABLE I

| Ingredient | 1 | 2 | 3 | 4 | 5 | 6 | 7 |
|---|---|---|---|---|---|---|---|
| Crude Rubber | 100 | 100 | 100 | 100 | 100 | 100 | |
| bis(para-di-iso-cyanate diphenyl) methane | 10 | 10.5 | 21 | 42 | 10.5 | 10.5 | 10 |
| Aluminum Hydrate | 10 | 12 | 25 | 50 | | | 10 |
| Borax | | | | | 12 | | |
| Sal Soda | | | | | | 12 | |
| Butadiene-styrene copolymer (monomer ratio 57:43) | | | | | | | 100 |

In forming a normally tacky and pressure-sensitive adhesive tape in accordance with this invention, the primer is applied in any conventional manner such, for example, as by knife coating or by a printed etched roll to one side of the tape backing such, for example, as cellophane or "Mylar" film. The primer is applied at a coating weight sufficient to form a continuous film and generally at a weight in the range of 0.01 to 0.5 oz./sq. yd. and preferably 0.05 to 0.2 oz./sq. yd. After coating, the primer coat is dried to remove solvent and subsequently is permitted to age on the backing before application of a compatible normally tacky and pressure-sensitive adhesive. The primer is aged at a suitable temperature and for a sufficient period of time to permit the primer to become well bonded to the backing. The time of aging will depend upon the particular film to which the primer is to be bonded and the temperature of aging. Hence, the higher the temperature of aging the lower will be the time required. In general, the temperature of aging varies from room temperature (70° F.) to a temperature which will not harm the tape backing, e.g., 200° F. for cellophane, while the time, which is an inverse function of the temperature, varies from as much as one day to as little as ten seconds. Examples of typical time and temperature conditions for aging on cellophane and "Mylar" films are as follows:

| Temp., ° F. | Time | |
|---|---|---|
| | Cellophane | Mylar |
| 200 | 10 seconds | 20 seconds. |
| 150 | 30 seconds | 60 seconds. |
| 90 | 2 hrs | 4 hrs. |
| 70 | 4 hrs | 8 hrs. |

By incorporating a water releasing agent in the primer composition an unexpected reduction in time for aging at a given temperature is effectuated. For example, the primer composition of Example I of Table I may be bonded to cellophane at 90° F. in only two hours. The same composition, however, without the aluminum hydrate, requires from 24 hours' to 2 days' aging period for proper bonding at 90° F. In like manner, the composition of Example I may be safely bonded to Mylar film in 4 hours at 90° F. while the same composition without aluminum hydrate requires 48 hours' aging period.

At the end of the primer aging period, a normally tacky and pressure-sensitive adhesive tape is applied on the primer coat in any conventional manner, such, for example, by solvent coating, etc. The adhesive must be compatible with the primer and generally includes a rubbery elastomeric component, a compatible tackifying resin, and, if so desired, fillers, plasticizers, anti-oxidants and other conventional adhesive additives. Examples of suitable elastomeric materials useful in forming adhesives are crude rubber, butadiene-styrene copolymers, polyvinyl ether, polyisobutylene and isobutylene-isoprene copolymers. In general, the adhesive is applied at a coating weight in the range of 0.5 to 3.0 oz./sq. yd., and preferably in the range of 0.75 to 1.25 oz./sq. yd. Examples of typical adhesive compositions whose anchorage to tape backings are greatly improved by the primer composition of this invention are now given, the figures referring to parts by weight.

Adhesive A

| | |
|---|---|
| Copolymer of acrylic ester and acrylonitrile ("Acrylon-BA 12") manufactured by Borden Company | 100 |
| P-octyl phenol formaldehyde heat hardening oil soluble resin, M.P. 80–90° C. | 12.0 |
| Modified phenol formaldehyde, M.P. 161–169° C. | 10.0 |
| Resin formed by condensation of aryl sulfonamides and formaldehydes, soft. pt. 60–65° C. | 98.0 |
| Dimethoxethyl phthalate | 30.0 |
| Di-tert-butyl-para-cresol | 2.2 |
| Calcium carbonate | 25.0 |

Adhesive B

| | |
|---|---|
| Natural crude rubber | 50.0 |
| Copolymer of butadiene-styrene (monomer ratio 76.5:23.5) | 50.0 |
| Pure hydrocarbon thermoplastic terpene, M.P. 110–120° C. | 43.5 |
| Zinc resinate, M.P. 150–156° C. | 10.4 |
| P-octyl phenol formaldehyde heat hardening oil soluble resin, M.P. 80–90° C. | 20.7 |
| 4-methyl-6-tertiary butyl phenol | 2.5 |

Adhesive C

| | |
|---|---|
| Acrylon BA–12 (butyl acrylate-acrylonitrile 88:12) | 100.00 |
| 6-di-tert-butyl 4 methyl phenol | 2.5 |

Adhesive D

| | |
|---|---|
| Natural crude rubber | 50.0 |
| Copolymer of butadiene-styrene (monomer ratio 76.5:23.5) | 50.0 |
| Pure hydrocarbon thermoplastic terpene, M.P. 110–120° C. | 45.0 |
| Zinc resinate, M.P. 150–156° C. | 10.4 |
| P-octyl phenol formaldehyde heat hardening oil soluble resin, M.P. 80–90° C. | 21.7 |
| 4-methyl-6-tertiary butyl phenol | 2.5 |
| Zinc oxide | 75.0 |

Adhesive E

| | |
|---|---|
| Natural crude rubber | 100.0 |
| Pure hydrocarbon thermoplastic terpene resin, M.P. 65–75° C. | 49.0 |
| P-octyl phenol formaldehyde heat hardening oil soluble resin, M.P. 80–90° C. | 5.0 |
| 2.5-di-tert-amyl hydroquinone | 1.0 |

Adhesive F

| | |
|---|---|
| Natural crude rubber | 100.0 |
| Thermoplastic terpene phenol resin, M.P. 125–135° C. | 40.0 |
| Glycerol ester of hydrogenated resin, M.P. 80–90° C. | 30.0 |
| P-octyl phenol formaldehyde heat hardening oil soluble resin, M.P. 80–90° C. | 5.0 |
| Lecithin | 4.0 |
| 2.5-di-tert-amyl hydroquinone | 1.0 |

Adhesive G

| | |
|---|---|
| Polyvinyl ethyl ether (solid yellow polymer manufactured by Bakelite Co. and sold as "Ex. BM" type | 100.0 |
| Glycerol ester of hydrogenated resin, M.P. 80–90° C. | 32.5 |
| Hydroabietyl alcohol | 12.5 |
| Lecithin | 1.0 |
| 2.5-di-tert-amyl hydroquinone | 5.0 |
| Mineral oil | 2.0 |

Adhesive H

| | |
|---|---:|
| Polyvinyl ethyl ether (solid yellow polymer manufactured by Bakelite Co. and sold as "Ex. BM" type | 100.0 |
| Glycerol ester of hydrogenated resin, M.P. 80–90° C. | 32.5 |
| Hydroabietyl alcohol | 12.5 |
| P-octyl phenol formaldehyde heat hardening oil soluble resin, M.P. 80–90° C. | 24.0 |
| Lecithin | 1.0 |
| 2.5-di-tert-amyl hydroquinone | 5.0 |
| Mineral oil | 2.0 |

For further explanation of the invention, reference is made to the following Table II showing many illustrative examples of adhesive tapes formed in accordance with this invention using the primers of this invention disclosed in Table I and many of the above adhesive compositions. In the tape examples of Table II, the primer is coated at a coating weight of 0.03 oz./sq. yd. and the adhesive coated at a coating weight of 1.0 oz./sq. yd. When the tape backing is cellophane, the primer is aged at 78° F. for 2 hours before application of the adhesive, while, when the tape backing is Mylar, the primer is aged at 78° F. for 4 hours.

TABLE II

| Example No. | Backing | Primer | Adhesive |
|---|---|---|---|
| 8 | Mylar | Example 1 | B |
| 9 | do | do | D |
| 10 | do | Example 2 | B |
| 11 | do | do | D |
| 12 | do | Example 3 | B |
| 13 | do | do | D |
| 14 | do | Example 4 | B |
| 15 | do | do | D |
| 16 | do | Example 5 | B |
| 17 | do | do | D |
| 18 | do | Example 6 | B |
| 19 | do | do | D |
| 20 | do | Example 7 | B |
| 21 | do | do | D |
| 22 | Cellophane | Example 1 | E |
| 23 | do | do | F |
| 24 | do | do | G |
| 25 | do | do | H |
| 26 | do | Example 2 | E |
| 27 | do | do | F |
| 28 | do | do | G |
| 29 | do | do | H |
| 30 | do | Example 3 | E |
| 31 | do | do | F |
| 32 | do | do | G |
| 33 | do | do | H |
| 34 | do | Example 4 | E |
| 35 | do | do | F |
| 36 | do | do | G |
| 37 | do | do | H |
| 38 | do | Example 5 | E |
| 39 | do | do | F |
| 40 | do | do | G |
| 41 | do | do | H |
| 42 | do | Example 6 | E |
| 43 | do | do | F |
| 44 | do | do | G |
| 45 | do | do | H |
| 46 | do | Example 7 | E |
| 47 | do | do | F |
| 48 | do | do | G |
| 49 | do | do | H |

Reference is now made to the accompanying drawing which shows in vertical cross section an embodiment of a normally tacky and pressure-sensitive adhesive tape prepared in accordance with this invention. A flexible backing such, for example, as cellophane film, is provided on one side with a primer coat 2 (e.g., primer of Example 1). An adhesive coat 3 (e.g., Adhesive F) is anchored to the backing 1 by means of said primer coat 2.

The invention in its broader aspects is not limited to the specific steps, methods, compositions, combinations and improvements described but departures may be made therefrom within the scope of the accompanying claims without departing from the principles of the invention and without sacrificing its chief advantages.

It is claimed:

1. A normally tacky and pressure-sensitive sheet comprising a flexible backing, a primer coating on at least one side of said backing, said primer coating comprising an elastomeric polymer, a multifunctional isocyanate selected from the group consisting of polyisocyanates, polyisothiocyanates and mixed isocyanate-isothiocyanate compounds, an inorganic hydrate, the inorganic hydrate being in an amount from about 5 to about 50 parts by weight per 100 parts of elastomeric polymer and the multi-functional isocyanate being in an amount from about 5 to about 50 parts by weight per 100 parts of elastomeric polymer, and on said primer coating a coating of a normally tacky and pressure sensitive adhesive compatible with the primer coat.

2. A normally tacky and pressure-sensitive adhesive sheet according to claim 1 wherein the elastomeric polymer is selected from the group consisting of natural rubber and butadiene-styrene copolymers.

3. A normally tacky and pressure-sensitive adhesive sheet according to claim 1 wherein the inorganic hydrate is selected from the group consisting of aluminum hydrate, borax and sal soda.

4. A normally tacky and pressure-sensitive adhesive sheet according to claim 1 wherein the elastomeric polymer is natural rubber.

5. A normally tacky and pressure-sensitive adhesive sheet according to claim 1 wherein the flexible backing is selected from the group consisting of cellulose acetate films, terephthalate polyester films, cellulophane, metalized terephthalate polyester films and polycarbonate films.

6. The method of preparing normally tacky and pressure-sensitive adhesive sheets comprising applying to a flexible backing a primer composition comprising an elastomeric polymer, a multifunctional isocyanate selected from the group consisting of polyisocyanates, polyisothiocyanates and mixed isocyanate-isothiocyanate compounds, and an inorganic hydrate, the inorganic hydrate being in an amount from about 5 to about 50 parts by weight per 100 parts of elastomeric polymer and the multi-functional isocyanate being in an amount from about 5 to about 50 parts by weight per 100 parts of elastomeric polymer, aging said primer composition under suitable time and temperature conditions to cause the primer to bond to the backing without deleteriously affecting said backing; and applying a pressure-sensitive adhesive comprising a rubbery material to the primed backing.

References Cited in the file of this patent
UNITED STATES PATENTS

| | | |
|---|---|---|
| 2,555,745 | Hopkins et al. | June 5, 1951 |
| 2,785,150 | Kreider et al. | Mar. 12, 1957 |
| 2,886,467 | Lavanchy | May 12, 1959 |

FOREIGN PATENTS

| | | |
|---|---|---|
| 712,053 | Great Britain | July 14, 1954 |
| 733,624 | Great Britain | July 13, 1955 |

UNITED STATES PATENT OFFICE
CERTIFICATION OF CORRECTION

Patent No. 2,964,422            December 13, 1960

Milton A. Bergstedt et al.

It is hereby certified that error appears in the above numbered patent requiring correction and that the said Letters Patent should read as corrected below.

Column 4, line 63, for "40", the amount of the ingredient opposite "Lecithin", read -- 4.0 --.

Signed and sealed this 30th day of May 1961.

(SEAL)
Attest:

ERNEST W. SWIDER            DAVID L. LADD
Attesting Officer            Commissioner of Patents